(12) United States Patent
Makino et al.

(10) Patent No.: US 10,316,883 B2
(45) Date of Patent: Jun. 11, 2019

(54) BLIND NUT

(71) Applicant: NEWFREY LLC, Newark, DE (US)

(72) Inventors: Takanori Makino, Toyohashi (JP);
Nobuharu Naito, Toyohashi (JP);
Kanji Sakoda, Toyohashi (JP);
Shinichi Suzuki, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 201 days.

(21) Appl. No.: 14/693,368

(22) Filed: Apr. 22, 2015

(65) Prior Publication Data

US 2016/0010679 A1  Jan. 14, 2016

(30) Foreign Application Priority Data

May 22, 2014 (JP) ................................ 2014-105969

(51) Int. Cl.
*F16B 37/06* (2006.01)
*F16B 37/04* (2006.01)

(52) U.S. Cl.
CPC .......... *F16B 37/048* (2013.01); *F16B 37/067* (2013.01)

(58) Field of Classification Search
CPC .............................. F16B 37/065; F16B 37/067
USPC ..................................... 411/183, 34, 38, 427
See application file for complete search history.

(56) References Cited

U.S. PATENT DOCUMENTS

| | | | | |
|---|---|---|---|---|
| 3,030,705 A | * | 4/1962 | Gill | ..................... B25B 27/0007 29/512 |
| 3,181,338 A | * | 5/1965 | Zetterlund | ............. B25B 27/00 29/524.1 |
| 3,369,442 A | * | 2/1968 | Darby | ................. F16B 19/1063 411/34 |
| 3,948,142 A | † | 4/1976 | McKay et al. | |
| 5,927,921 A | * | 7/1999 | Hukari | .................... F16B 31/06 411/186 |

(Continued)

FOREIGN PATENT DOCUMENTS

| | | | |
|---|---|---|---|
| GB | 536476 | † | 5/1941 |
| JP | 2004011876 | † | 1/2004 |

(Continued)

*Primary Examiner* — Flemming Saether
(74) *Attorney, Agent, or Firm* — Kofi A. Schulterbrandt; Michael P. Leary

(57) ABSTRACT

A blind nut including an internal threaded portion, a hollow tubular portion adjacent to the internal threaded portion, and a flange with hole, formed at the end on the opposite side to the internally threaded portion. The internal threaded portion is inserted into an attaching hole of the attached-to member, a part of the tubular portion is plastically deformed to expand in diameter, and the attached-to member is held between the deformed expanded diameter portion and the flange. The internal threaded portion includes a first straight portion adjacent to the tubular portion, a first tapered portion with an outside diameter gradually decreasing from the first straight portion, a second straight portion with an outside diameter smaller than the first straight portion, a second tapered portion with an outside diameter decreasing from the first straight portion, and a third straight portion with an outside diameter smaller than the second straight portion.

6 Claims, 8 Drawing Sheets

(56) References Cited

U.S. PATENT DOCUMENTS

| | | | |
|---|---|---|---|
| 7,393,169 B2 * | 7/2008 | Sußenbach | F16L 329/00 411/183 |
| 7,438,773 B2 * | 10/2008 | Denham | B21D 39/06 148/573 |
| 2005/0031433 A1 * | 2/2005 | Neri | B21K 1/70 411/180 |
| 2006/0291974 A1 * | 12/2006 | McGee | B25B 27/0014 411/171 |
| 2008/0016667 A1 * | 1/2008 | Lanni | B21J 15/025 29/240.5 |

FOREIGN PATENT DOCUMENTS

| | | | |
|---|---|---|---|
| JP | 2004188558 | † | 7/2004 |
| JP | 2010042503 | † | 2/2010 |

\* cited by examiner
† cited by third party

BLIND NUT

RELATED APPLICATIONS

This application claims priority from Japanese Patent Application No. 2014-105969, filed May 22, 2014, the disclosure of which is incorporated herein by reference in its entirety.

BACKGROUND OF THE INVENTION

The present invention pertains to a blind nut. More particularly, it pertains to a blind nut on which the outer circumferential shape of the internal threaded portion is optimized with consideration for the distribution of tension placed on the internal threaded portion of the nut.

A blind nut comprises an internal threaded portion, a tubular portion continuing from the internal threaded portion, and a flange at the end portion of the tubular portion. Using a fastening device such as the one set forth in Japanese Published Unexamined Patent Application 2004-188558, the blind nut is inserted through a hole in an attached-to member with the screw mandrel of the fastening device threaded into the internal threaded portion; the screw mandrel is retracted, buckling the tubular portion so as to expand its diameter; and the attached-to member is sandwiched between the buckled tubular portion and the flange, affixing the blind nut to the attached-to member. The male thread of a bolt can be engaged with the internal threaded portion of this blind nut to attach an attaching member to an attached-to portion. The blind nut permits work to be performed from one side of the attached-to member, thereby facilitating the fastening of nuts to members which cannot be worked on from the reverse side, such as panels or other attached-to members.

FIG. 1 is a front elevation showing a conventional blind nut 10 viewed in cross section. Blind nut 10 has a cylindrical form which is entirely axially symmetrical about its center axis, having an internal threaded portion 11 at one end. Internal threaded portion 11 is cylindrical, and has formed within it an internal thread 15. The external thread of a fastening device can be caused to engage internal thread 15. The tubular portion 13 continuing on internal threaded portion 11 is cylindrical; it has a thinner wall than internal threaded portion 11 and is the part that buckles when attaching to attached-to member 41. Blind nut 10 has a flange 14 at the end opposite internal threaded portion 11. The outside diameter of flange 14 is greater than the inside diameter of attaching hole 43 in attached-to member 41, and when blind nut 10 is inserted in the attaching hole 43 in attached-to member 41, the bottom surface of tubular portion 13 contacts the top surface of attached-to member 41 and stops. A through hole 16 is formed from the flange 14-side end portion to the internal threaded portion 11-side end portion. The inside diameter of through hole 16 from the flange 14-side end portion to the internal threaded portion 11-side end portion is constant, and the inside diameter diminishes in internal threaded portion 11.

FIG. 2 is a front elevation showing a partial section after blind nut 10 has been attached to the attaching hole 43 in attached-to member 41. When blind nut 10 is attached using a fastening device, thin-walled tubular portion 13 buckles so as to expand in diameter, becoming expanded diameter portion 17; attached-to member 41 is sandwiched between expanded diameter portion 17 and flange 14, and blind nut 10 is attached to attached-to member 41.

Generally, when tubular portion 13 is caused to buckle and a blind nut 10 is attached, a strong tensile force is placed on internal threaded portion 11; internal threaded portion 11 therefore requires sufficient strength to prevent deformation. Conventionally, however, no consideration was given to the distribution of tensile force placed on the internal threaded portion 11 of blind nut 10 when determining the wall thickness of internal threaded portion 11. Therefore, a risk existed that internal threaded portion 11 would deform when attaching a blind nut. If the wall thickness was greater than necessary, excessive amounts of material may have been used, increasing weight and driving up cost.

JP Published Unexamined Patent Application 2010-42503 discloses a method for manufacturing a threaded blind nut (blind nut) from metal. This method includes a cold forming stage for partially forming the insert, except for the internal thread, using a cold forming method, a screw cutting stage for cutting the internal thread, and a stage for tempering of appropriate parts of the insert in order to promote post-deformation during installation.

On the blind nut of JP Published Unexamined Patent Application 2010-42503, a tapered portion is disposed between the internal threaded portion and the tubular portion; a tapered portion is also disposed on the tip portion of the internal threaded portion, and the internal threaded portion diameter gradually decreases toward the tip.

However in the blind nut of JP Published Unexamined Patent Application 2010-42503, the determination of the wall thickness of the internal threaded portion does not go so far as to consider the distribution tensile force amounts placed on the internal threaded portion. Hence, there is a risk that the internal threaded portion will deform and break due to tensile force placed on the internal threaded portion when the blind nut is attached. Or, the wall thickness of the internal threaded portion may be increased unnecessarily, producing a heavy and costly blind nut.

U.S. Pat. No. 3,948,142 discloses an integral blind nut comprising a body member having an end part with an internal thread. On the end portion opposite the end portion (internal threaded portion) having the internal thread, a sawtooth-shaped end part is provided in order to attach the blind nut to a work piece without rotating. A deformable wall portion (tubular portion) is provided between the end portion with internal thread and the sawtooth-shaped end portion.

The internal threaded portion of the blind nut in U.S. Pat. No. 3,948,142 has a narrow-tipped part, a thick part adjacent to the deformable wall portion (the tubular portion), and a tapered portion between them. However, the blind nut of U.S. Pat. No. 3,948,142, similar to the blind nut of JP Published Unexamined Patent Application 2010-42503, does not consider the distribution of tensile force amounts placed on the internal threaded portion. Hence, there is a risk that when the blind nut is attached, the internal threaded portion will be stretched out, expanding radially and breaking the blind nut. Or, the wall thickness of the internal threaded portion may be increased unnecessarily, producing a heavy and costly blind nut.

JP Published Unexamined Patent Application 2004-11876 discloses a blind nut comprising a main member made up of plastically deformable metal or the like, and a nut member made of a rigid material such as metal or the like, separate from the main member. The main member has a hollow tubular portion and a flange at one end thereof. The nut member has an internal threaded portion and a linking portion. The main member receives the nut member on the inside. The extended portion of the tubular portion of the main member is linked to the linking portion of the nut member.

In the first embodiment of JP Published Unexamined Patent Application 2004-11876, a knurled channel is formed extending in the longitudinal direction on the outside surface of the blind nut main member. In another embodiment, a projection biting into the attached-to member is formed on the bottom surface of the flange. This prevents the blind nut from slipping relative to the attached-to member when a bolt is engaged in the nut member and tightened.

However, in the nut member of the blind nut in Patent Reference 3, the wall thickness of the internal threaded portion is uniform, and no consideration is given to the fact that the tensile force placed on the internal thread end portion is greatest. Hence, there is a risk that when the blind nut is attached, the internal threaded portion will be stretched out, expanding in the radial direction and breaking the blind nut. Or, the wall thickness of the internal threaded portion may be increased unnecessarily, producing a heavy and costly blind nut. Therefore, a blind nut has been sought with sufficient strength to withstand the tensile force placed on the internal threaded portion when a blind nut is attached.

Further, a light-weight and low-cost blind nut has been sought. In addition, a blind nut has been sought which does not turn easily at the time of and subsequent to attachment to an attached-to member.

One object of the present invention is therefore to provide a blind nut having sufficient strength to withstand the tensile force placed on an internal threaded portion when the blind nut is attached to an attached-to member. Another object of the present invention is to provide a light-weight and low-cost blind nut. Another object of the present invention is to provide a blind nut capable of reliable attachment to an attached-to member without rotating freely.

SUMMARY OF THE INVENTION

To achieve these objects, in the present invention, using a fastening device, a tubular portion is caused to buckle, and when a blind nut is attached to an attached-to member, using the male thread of a screw mandrel, consideration is given to the distribution of tensile force placed on the internal threaded portion by subjecting the parts to a large tensile force sufficiently thick that deformation does not occur, and making the parts subjected to a weaker tensile force of a thin fastener, thereby reducing the weight.

In the present invention, tapered portions are provided between multiple straight portions and their adjacent straight portions in the internal threaded portion; the wall thickness in parts subjected to a strong tensile force adjacent to the tubular portion of the internal threaded portion is made thick [so as to be] capable of withstanding strong tensile force, and the wall thickness of the internal threaded portion gradually decreases toward the tip portion.

In the present invention, the outside diameter and length of the internal threaded portion were set using the distribution of tensile force placed on the blind nut internal threaded portion. A first embodiment of the present invention is a blind nut comprising an internal thread portion inside of which an internal thread is formed, a hollow tubular portion adjacent to the internal threaded portion, and a flange with opening, formed at the end portion of the tubular portion on the opposite side from the internal threaded portion; whereby the internal threaded portion and tubular portion are inserted into the attaching hole of an attached-to member; a portion of the tubular portion is plastically deformed so as to expand in diameter, the attached-to member is held between the deformed wide diameter portion and the flange, and the blind nut is attached to the attached-to member.

The internal threaded portion includes, a first straight portion adjacent to the tubular portion, having a fixed outside diameter; a first tapered portion adjacent to the first straight portion, having an outside diameter which gradually decreases starting at the first straight portion; a second straight portion adjacent to the first tapered portion, having an outside diameter smaller than the first straight portion; a second tapered portion adjacent to the second straight portion, having an outside diameter which gradually decreases starting at the first straight portion; and a third straight portion adjacent to the second tapered portion and having a smaller outside diameter than the second straight portion.

In this way, the blind nut internal threaded portion is made thick in parts subjected to strong tensile force, thereby having sufficient strength and made thin in parts not subject to a large tensile force, thereby reducing both the weight and the cost.

Assuming an inside diameter D for the internal threaded portion roots:

the first straight portion preferably has an outside diameter of D x≥1.3 to D x≤2.6;

the second straight portion an outside diameter of D x≥1.2 to D x≤2.4;

and the third straight portion an outside diameter of D x≥1.1 to D x≤2.2.

The first straight portion is thick, with a wall thickness of D x≥1.3, and therefore can sufficiently withstand tensile force applied to the internal threaded portion in the center axial direction. In the second and third straight portions, the tensile force applied to the internal threaded portion in the center axial direction is smaller than in the first straight portion, and tensile force can be sufficiently withstood even if the wall thickness is thinner than in the first straight portion.

Strength increases with wall thickness in the first through third straight portions; however, from a practical standpoint, a maximum wall thickness equal to twice the minimum wall thickness was used. The first straight portion preferably has a length of ≥2 pitches and ≤4 pitches of the internal threaded portion, the second straight portion has a length of ≥1 pitch and ≤2 pitches of the internal threaded portion, and the third straight portion has a length of ≥0.4 pitches of the internal threaded portion.

A strong tensile force is placed on the 1st straight portion, but since ≥2 pitches of the internal thread are engaged, [the thread] can withstand a strong tensile force. From a practical standpoint, the maximum length of the 1st straight portion was set at twice the minimum length. The tensile force placed on the second and third straight portions is smaller than the tensile force placed on the first straight portion, so even if the pitch [over which] the internal thread is engaged is made shorter than the first straight portion, [the thread] can withstand the tensile force applied.

From a practical standpoint, the maximum length of the second straight portion was set at twice the minimum length. The first tapered portion preferably has a length of ≥1 pitch and ≤2 pitches of the internal thread of the internal threaded portion, and the second tapered portion has a length of ≥1 pitch and ≤2 pitches of the internal thread of the internal threaded portion. The tensile force placed on the first and second tapered portions is smaller than the tensile force placed on the first straight portion; therefore, even if the length engaged by the internal thread is shorter than the first straight portion, the [thread] can withstand the tensile force placed on it.

A knurled channel is preferably formed on the outside circumference of the tubular portion, extending circumferentially in the vertical direction at a fixed interval. When fastening a blind nut to an attached-to member using a fastening device, the blind nut can be held by the knurled channel so as not to rotate. Projecting portions extending radially outward are preferably formed at fixed intervals in the circumferential direction on the surface of the tubular portion under the flange. If projections are formed on the reverse side of the flange at the top end portion of the tubular portion, the projections can bite into the attached-to member and hold it so that the blind nut does not rotate. Also, conductivity can be established between the attached-to member and the blind nut.

Elongated projections are preferably formed in the vertical direction at fixed intervals in the circumferential direction on the reverse side of the flange at the top end portion of the tubular portion. With elongated projections formed on the reverse side of the flange at the top end portion of the tubular portion, the projections eat into the attached-to member and can hold the blind nut so that it does not rotate. Also, conductivity can be established between the attached-to member and the blind nut.

Using the present invention, a blind nut can be obtained having sufficient strength to withstand the tensile force applied to an internal threaded portion when attaching the blind nut to an attached-to member. A lower-weight, low-cost blind nut can also be obtained. Furthermore, a blind nut can be obtained capable of reliable attachment to an attached-to member without spinning freely.

DETAILED DESCRIPTION OF THE PREFERRED EMBODIMENTS

Figure 3:
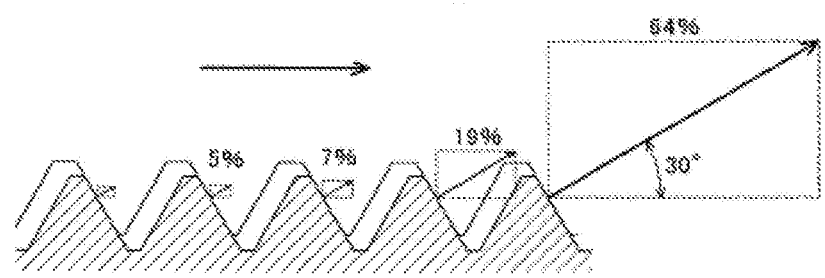
FIG. 3: A diagram showing the distribution of axial force on a thread ridge.

FIG. 3 is a diagram showing the distribution of tensile force to a thread ridge based on material from Stanley Black and Decker, Inc. As shown in FIG. 3, tensile force is applied to the flanks of the thread ridge in the vertical direction. If the angle of the thread ridge is 60°, tensile force is applied in a direction 30° relative to the internal thread center axis. This tensile force can be resolved into a tensile force in the center axial direction (axial force) and a radial direction component perpendicular to the center axis.

Of the total tensile force, 64% is applied to the thread ridge at the end portion; 19% of the tensile force is applied to the second thread ridge; and 7% of the tensile force is applied to the third thread ridge. Thus, a great tensile force is applied to the thread ridge at the end portion, and the tensile force applied to the second and subsequent thread ridges drops off rapidly.

Figure 4:
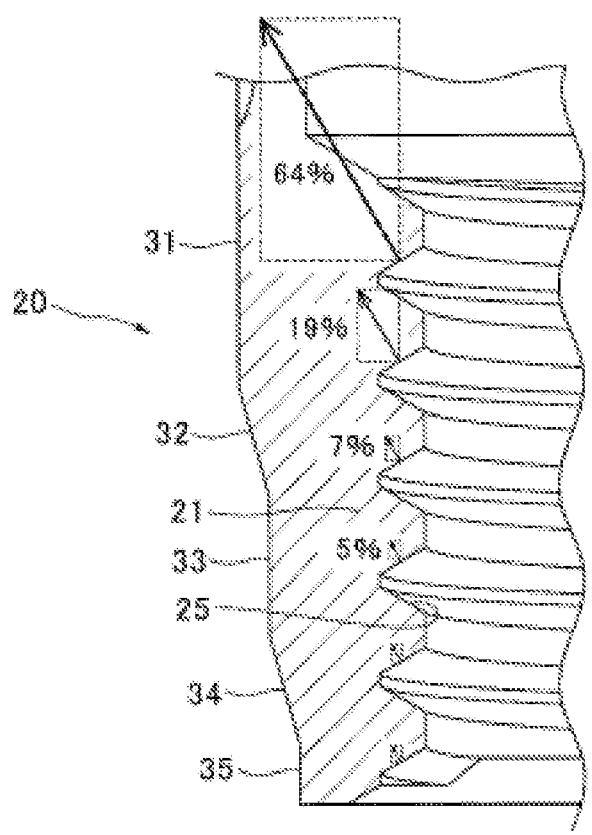
FIG. 4: A diagram in which the axial force distribution on the thread ridge in FIG. 3 is applied to a blind nut.

FIG. 4 is a diagram in which the thread ridge tensile force distribution of FIG. 3 is applied to a blind nut. When a blind nut is attached to an attached-to member using a fastening device, a tensile force is applied in the center axial direction to the thread ridges of the internal thread as a result of the retraction of the fastening device screw mandrel.

Following FIG. 3, 64% of the tensile force is applied to the thread ridge at the end portion. In the present invention, with consideration given to the tensile force distribution applied to internal threads in the internal threaded portion of this type of blind nut, the walls at the end portion (adjacent to the tubular portion) of an internal threaded portion where a large tensile force is applied are made thick so as to withstand strong tensile force. Parts not subjected to a great tensile force applied are made thin. The internal thread comprises multiple straight portions of differing wall thicknesses and tapered portions between adjacent pairs of straight portions; the wall thickness of the internal threaded portion gradually decreases from the tubular portion toward the tip portion.

Figure 5:
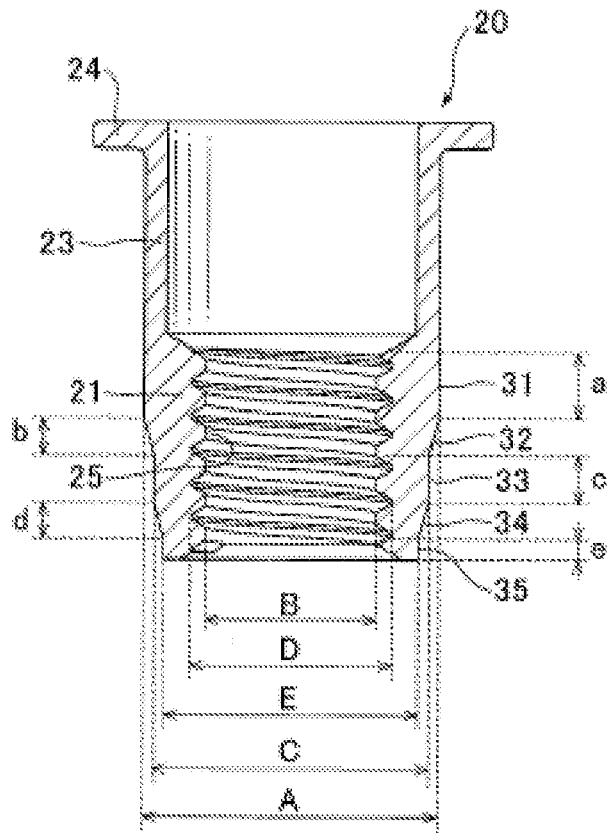
FIG. 5: A cross section of a blind nut according to the first embodiment of the present invention.

FIG. 5 is a cross section of a blind nut according to a first embodiment of the present invention. Steel or the like is preferred as a material for blind nut 20. Blind nut 20 is a cylinder, axially symmetrical as a whole about a center axis, having an internal threaded portion 21. An internal thread 25 is formed on the inside of internal threaded portion 21. The male thread of the fastening device screw mandrel can be made to engage internal thread 25. Furthermore, after attaching blind nut 20, the male thread on the bolt can be engaged to attach the attached-to member.

Blind nut 20 is adjacent to internal threaded portion 21 and has a tubular portion 23. Tubular portion 23 has thin walls and buckles when attached to attached-to member 41. Blind nut 20 is adjacent to tubular portion 23 and has a flange 24 at the end portion on the opposite side to internal threaded portion 21. The outside diameter of flange 24 is greater than the outside diameter of tubular portion 22 [sic; probably 23], and is greater than the inside diameter of the attaching hole 43 in attached-to member 41.

Inside internal threaded portion 21, an internal thread 25 is formed with a fixed inside diameter over the entire length of internal threaded portion 21. Internal threaded portion 21 has a first straight portion 31, adjacent to tubular portion 22, with the same outside diameter as tubular portion 22; a first tapered portion 32, adjacent to the first straight portion, with taper; a second straight portion 33, adjacent to first tapered portion 32 and having an outside diameter smaller than the first straight portion; a second tapered portion 34, adjacent to second straight portion 33; and a third straight portion 35, adjacent to second tapered portion 34, having an outside diameter smaller than the second straight portion.

Assuming a diameter D for the roots in the internal thread, first straight portion 31 has an outside diameter A with a dimension of D x≥1.3 to D x≤2.6. The outside diameter of the top end portion of first tapered portion 32 is the same as the outside diameter A of first straight portion 31, and the outside diameter of the bottom end portion is the same as the outside diameter C of second straight portion 33. Second straight portion 33 has thinner walls than first straight portion 31 and has an outside diameter C of D x≥1.2 to D x≤2.4. The outside diameter of the top end portion of second tapered portion 34 is the same as the outside diameter C of second straight portion 33, and the outside diameter of the bottom end portion is the same as the outside diameter E of third straight portion 35. Third straight portion 35 has thinner walls than second straight portion 33 and has an outside diameter E of D x≥1.1 to D x≤2.2.

First straight portion 31 has a thick wall thickness of D x≥1.3, and is fully capable of withstanding stress (axial force). Regarding maximum wall thickness, strength increases with thickness; however, if unnecessarily thick, weight becomes heavy and cost is high, so we selected D x≤2.6, which is twice the minimum wall thickness. In second straight portion 33 and third straight portion 35, the tensile force in the center axial direction placed on the internal threaded portion is smaller than the tensile force placed on first straight portion 31. The minimum wall thickness is thinner than first straight portion 31 but is fully able to withstand stress. The maximum wall thickness is also set to be smaller than first straight portion 31. This is because if wall thickness is unnecessarily thick, weight becomes heavy and cost is incurred.

The diameter of the internal thread ridge is assumed to have an effective diameter B. The first straight portion 31 has a length a, which is ≥2 pitches and ≤4 pitches of internal thread from the top end of the internal thread ridge. First tapered portion 32 has a length b, which is ≥1 pitches and ≤2 pitches of internal thread from the bottom end of first straight portion 31. Assuming a taper angle of 90°, the first tapered portion 32 can also be eliminated. Second straight portion 33 has a length c, which is ≥1 pitches and ≤2 pitches of internal thread from the bottom end of first tapered portion 32. Second tapered portion 34 has a length d, which is ≥1 pitches and ≤2 pitches of internal thread from the bottom end of second straight portion 33. Assuming a taper angle of 90°, the second tapered portion 34 can also be eliminated. Third tapered portion 35 has a length e, which is ≥0.4 pitches of internal thread from the bottom end of second tapered portion 34. The third straight portion 35 is not required.

Thus, first straight portion 31, to which a strong tensile force is applied, has a length a which is ≥2 pitches of internal thread, giving it high strength. The tensile force applied to the internal thread adjacent to the tubular portion is 64% of the total, whereas the tensile force applied to the internal thread adjacent to this internal thread weakens abruptly to 19%; therefore, the wall thickness should have a length of at least ≥2 internal thread pitches. The strength of first straight portion 31 increases with length, but if too long, the space in which the blind nut is set will be large, so a maximum length of 4 pitches of internal thread, which is twice the minimum length, was adopted. In other parts, the tensile force is weaker than in first straight portion 31, and can therefore have sufficient strength, even with a length of ≥1 pitch of internal thread.

Figure 6:
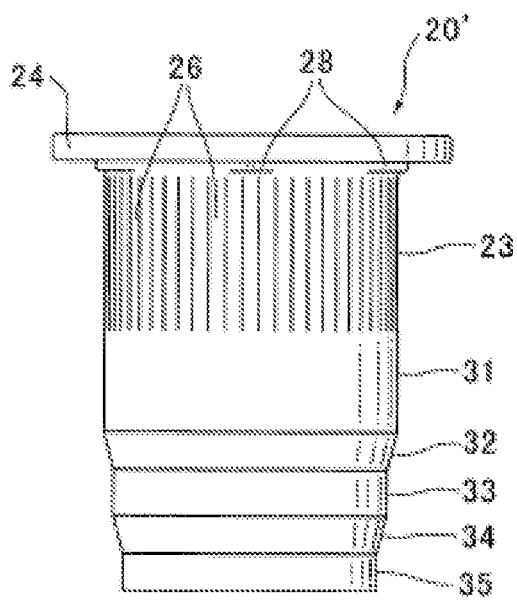
FIG. 6: A front elevation of a blind nut according to the second embodiment of the present invention.
Figure 7:
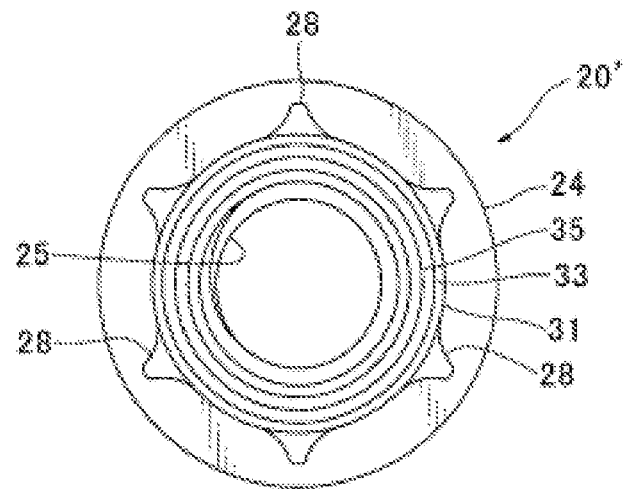
FIG. 7: A bottom view of the blind nut of FIG. 6.
Figure 8:
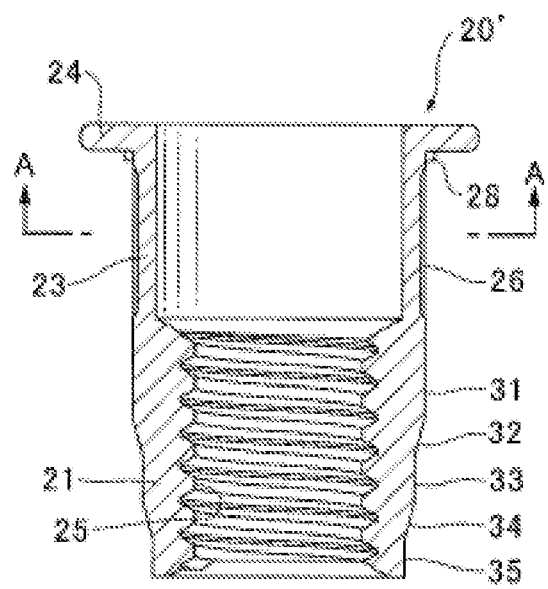
FIG. 8: A cross section along the center axis of the blind nut of FIG. 6.
Figure 9:
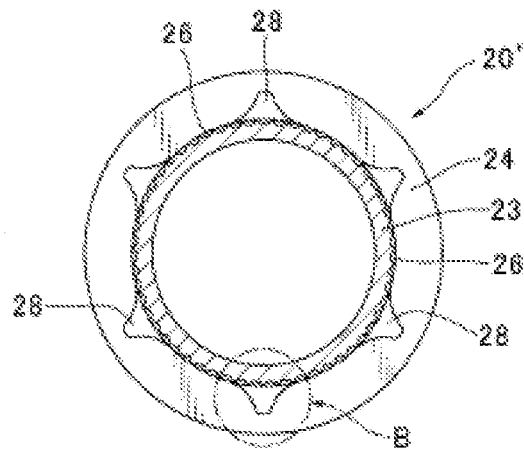
FIG. 9: A cross section along line A-A in FIG. 8.
Figure 10:
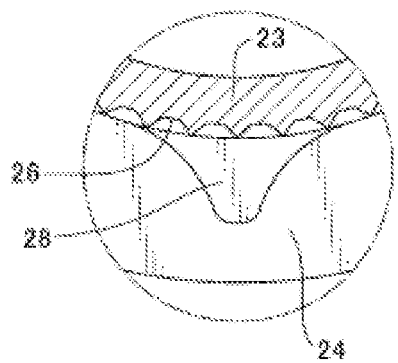
FIG. 10: An expanded view of part B in FIG. 9.

FIGS. 6 through 10 show a blind nut 20' according to a second embodiment of the present invention. FIG. 6 is a front elevation of blind nut 20'; FIG. 7 is a bottom view; FIG. 8 is a cross section along the center axis; FIG. 9 is a cross section along line A-A in FIG. 8; FIG. 10 is an expanded view of the part B in FIG. 9.

Regarding blind nut 20' according to a second embodiment, those parts which are the same as blind nut 20 in the first embodiment are indicated by the same reference numerals. We shall explain the parts that differ from the blind nut according to the first embodiment. As shown in FIG. 6, in a blind nut 20' according to the second embodiment, a knurled slot 26 is formed on the outside perimeter of tubular portion 23. Knurled slots 26 are a convex channels as shown in FIG. 9, extending vertically at a fixed spacing around the outside perimeter. When fastening with a fastening device, blind nut 20' can be held without rotation using knurled slot 26. Blind nut 20' bites into the surface of attached-to member 41 after being attached, thereby being held so as to prevent rotation.

As shown in FIGS. 7 and 9, projections 28 are formed at a fixed spacing around the outside perimeter on the surface of the tubular portion 23 under flange 24 at the top end of tubular portion 23 on blind nut 20' according to the second embodiment. In the diagramed example, 6 projections 28 are formed. As shown in FIG. 10, which is an expanded view of part B in FIG. 9, projections 28 are ridges facing the outside circumferential direction, formed from the top end of tubular portion 23, with a fixed thin thickness in the axial center direction. When blind nut 20' is attached to attached-to member 41, projections 28 bite into the surface of attached-to member 41 so that after attachment it is held so as not to rotate. When attaching blind nut 20' in a stage subse-quent to painting, the blind nut can bite into the paint film formed on attached-to member 41 so that electrical conductivity can be obtained between blind nut 20' and attached-to member 41.

Figure 11:
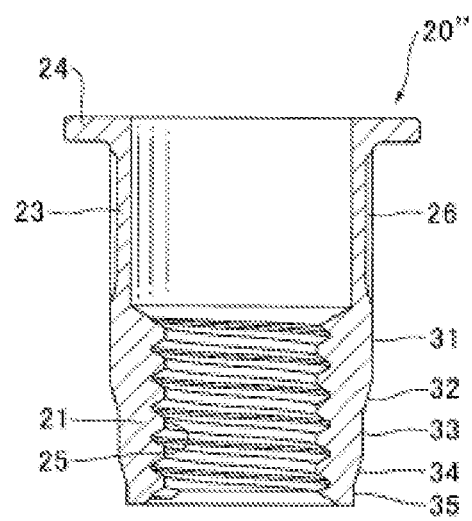
FIG. 11: A cross section of a blind nut according to a third embodiment of the present invention.
Figure 12:
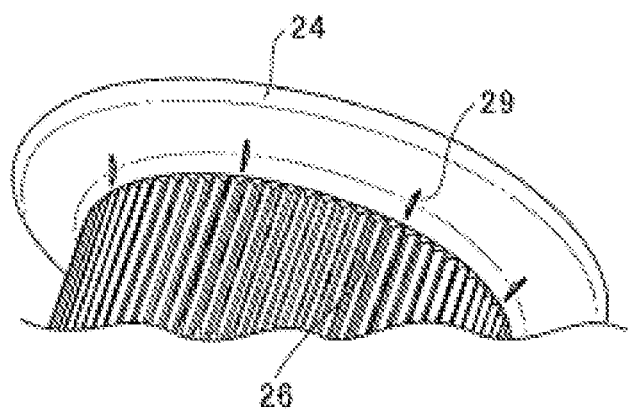
FIG. 12: A perspective view of the blind nut tubular portion of FIG. 11 and flange underside part.
Figure 13:
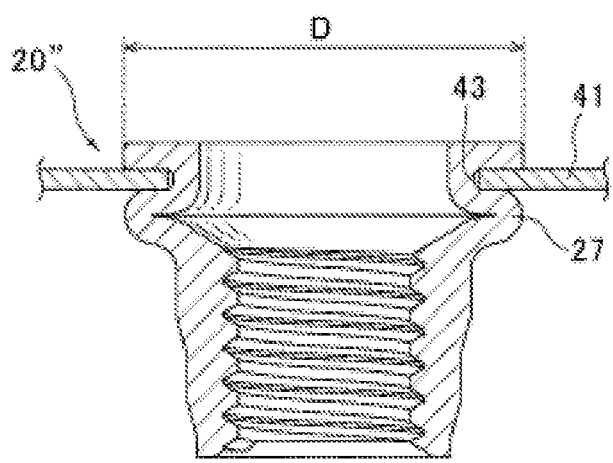
FIG. 13: A cross section showing the state in which the tubular portion of the blind nut of FIG. 11 has been buckled and attached to an attached-to member.

FIGS. 11-13 show a blind nut 20" according to third embodiment of the present invention. FIG. 11 is a cross section of a blind nut 20" according to a third embodiment; FIG. 12 is a perspective view of the bottom surface portion of the tubular portion 23 and flange 24 of blind nut 20". As shown in FIG. 12, projections 29 are formed at equal spacing in the outward circumferential direction around the perimeter at a thin thickness on the bottom surface of flange 24 at the top end portion of tubular portion 23. When blind nut 20" is attached to attached-to member 41, projections 29 bite into the surface of attached-to member 41 so that after attachment the blind nut is held so as not to rotate. When attaching blind nut 20" in a stage subsequent to painting, the blind nut can bite into the paint film formed on attached-to member 41 so that electrical conductivity can be obtained between blind nut 20" and attached-to member 41.

FIG. 13 is a cross section in which the tubular portion of blind nut 20" has been buckled and attached to attached-to member 41. The outside diameter D of the flange on blind nut 20" is 12 mm. The outside diameter of the expanded diameter portion 27 where tubular portion 23 has been buckled is arranged to be approximately the same 12 mm as the flange outside diameter D. A large outside diameter for expanded diameter portion 27 results in a high strength against pulling out from the attached-to member, allowing for reliable attachment to the attached-to member.

We shall next compare how the internal threaded portions of blind nuts 10, 20 deform as the result of tensile force applied to the internal threaded portion by screw mandrel 53 when a conventional blind nut 10 is attached to an attached-to member 41, and when a blind nut 20 of the first embodiment of the invention is attached to attached-to member 41.

We shall now explain the attaching operation for a conventional blind nut. Screw mandrel 53 on fastening device 50 is turned in the forward direction, and screw mandrel 53 is made to engage internal thread 15 on the internal threaded portion 11 of blind nut 10. With the bottom surface of fastening device 50 nose piece 52 in contact and supporting flange 14 on blind nut 10, blind nut 10 is inserted into attaching hole 43 on attached-to member 41, and flange 14 is brought into contact with attached-to member 41 and pulled to main body 51 without rotating screw mandrel 53. At this point, the bottom surface of nose piece 52 pushes the blind nut 10 flange 14 downward and supports it, [while] screw mandrel 53 raises internal threaded portion 11 upward. The tubular portion 13 of blind nut 10 is plastically deformed so as to buckle and expand in diameter, becoming expanded diameter portion 17, and attached-to member 41 is sandwiched and affixed between expanded diameter portion 17 and flange 14.

Figure 1:
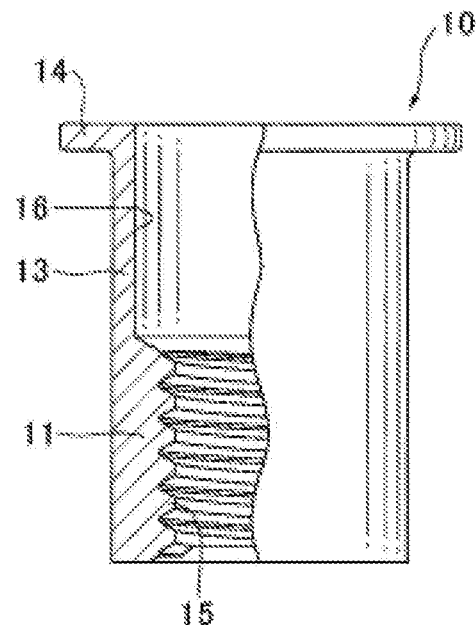
FIG. 1: A front elevation showing a partial cross section of a conventional blind nut.
Figure 2:
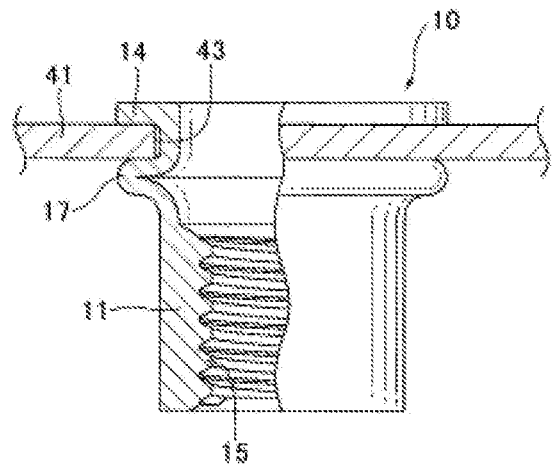
FIG. 2: A front elevation showing a partial cross section in which the blind nut of FIG. 1 is attached to an attached-to member.
Figure 14A:
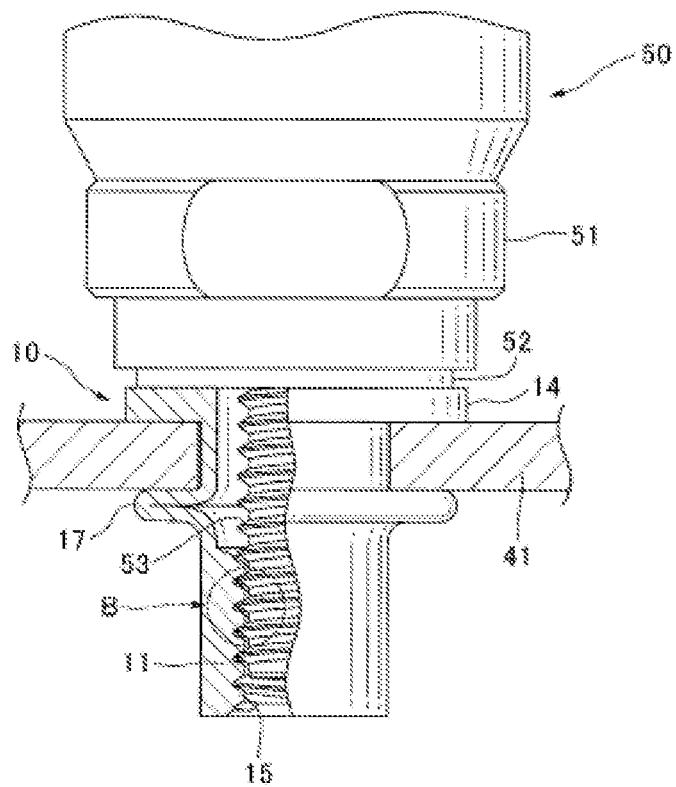
FIG. 14A: A front elevation of a partial cross section showing the state in which the conventional blind nut of FIG. 1 is attached to an attached-to member by a fastening device.
Figure 14B:
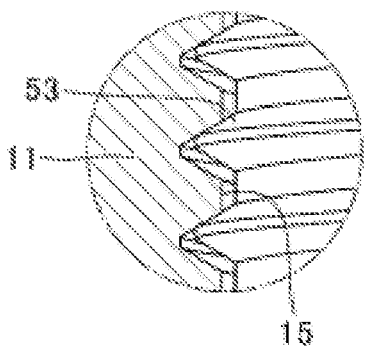
FIG. 14B: An expanded view of part B in FIG. 14A.

FIG. 14A is a front elevation, being a partial cross section showing the state whereby a conventional blind nut 10 shown in FIG. 1 is attached to attached-to member 41. FIG. 14B is an expanded view of the B part of FIG. 14A. As shown in FIG. 14A, when the internal thread 15 in internal threaded portion 11 is strongly pulled up by screw mandrel 53, a diagonal tensile force is applied to internal thread 15. The center axial-direction tensile force (axial force) acts to stretch internal thread 15 in the center axial direction, and the radial component of the tensile force acts to expand internal threaded portion 11 radially outward. If, in a conventional blind nut 10, the overall wall thickness of the internal thread is made thin in order to reduce the weight, there is a risk that the top portion of internal threaded portion 11, under a strong tensile force, will be stretched in the center axial direction, expanding the internal thread of blind nut 10 in the radial direction and decreasing the contact surface area between the external thread on screw mandrel 53, thereby breaking blind nut 10. Also, if internal thread 15 of blind nut 10 deforms when blind nut 10 is attached to attached-to member 41, then when a bolt is engaged with internal thread 15 on the blind nut 10 attached to attached-to member 41, the bolt will not engage the thread properly.

Figure 15A:
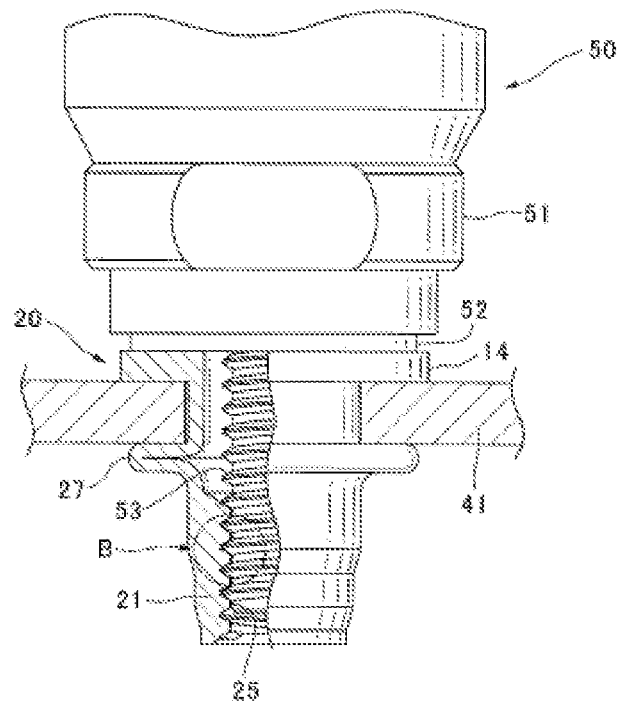
FIG. 15A: A front elevation of a partial cross section showing the blind nut of FIG. 5 attached to an attached-to member by a fastening device.
Figure 15B:
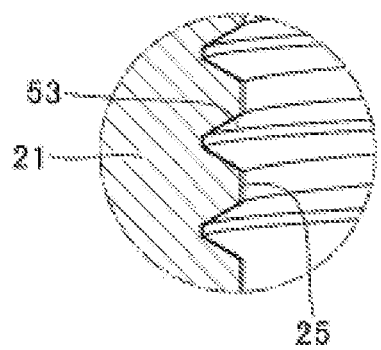
FIG. 15B: An expanded view of part B in FIG. 15A.

We shall next explain the case in which a blind nut 20 according to the first embodiment of the invention is attached. The operation of attaching blind nut 20 to attached-to member 41 using fastening device 50 is the same as the above-described operation for attaching a conventional blind nut 10 to attached-to member 41. FIG. 15A is a front elevation of a cross section of a portion showing the blind nut 20 of the first embodiment attached to attached-to member 41. FIG. 15B is an expanded view of the B part of FIG. 15A.

As shown in FIG. 15A, when the internal thread 25 in internal threaded portion 21 of blind nut 20 is strongly pulled up by screw mandrel 53, a diagonal tensile force is applied to internal thread 25. The center axial-direction tensile force acts to extend internal thread 15 in the center axial direction, and the radial component of the tensile force acts to stretch internal thread 25 in the center axial direction, and the radial direction component of the tensile force acts to expand internal threaded portion 21 radially outward. The blind nut 20 of the present invention, with consideration for the distribution of tensile force, is sufficiently thick in the top part where a strong tensile force is applied to internal thread 25 (the part adjacent to expanded diameter portion 27). Therefore, as shown in FIG. 15B, even if a strong tensile force is applied to the top part of internal threaded portion 21, there is no stretching in the center axial direction and no expansion in the radial direction. The contact surface area between screw mandrel 53 and the internal thread of blind nut 20 is maintained normally. There is therefore no risk that blind nut 20 will break.

When attaching blind nut 20 to attached-to member 41, blind nut 20 internal thread 25 is not deformed; therefore, when a bolt is further engaged in the internal thread 25 of blind nut 20 and attached to the attached-to member, the bolt threads normally. With consideration for the distribution of tensile force, blind nut 20 of the first embodiment of the present invention is made sufficiently thick in the part of the internal thread where a strong tensile force is applied, so that even if pulled up with extreme force by screw mandrel 53, internal threaded portion 21 does not expand in the radial direction, and there is no risk that blind nut 20 will break. The wall thickness of parts of the internal thread portion not subjected to strong transmission are made thin, enabling reduced weight and cost.

In Embodiments 1 through 3 of the present invention, the straight portions have three stages, and two stages of tapered portion are placed between each of the straight portions. It is also possible to use two stages of straight portion and provide one stage of tapered portion between the two straight portions. Or, four or more stages of straight portion can be used, with tapered portions provided between adjacent straight portions.

The embodiments of the present invention facilitate a blind nut with a strength capable of withstanding tensile force from a bolt. A light-weight, low-cost blind nut can also be obtained.

The invention claimed is:

1. A blind nut comprising an internally thread portion, a hollow tubular portion adjacent to the internal threaded portion, and a flange with an opening, formed at an end portion of the tubular portion on an opposite side from the internal threaded portion; whereby the internal threaded portion and tubular portion are inserted into the attaching hole of an attached-to member; a portion of the tubular portion is plastically deformed so as to expand in diameter; and the attached-to member is held between the deformed wide diameter portion and the flange, the blind nut thereby being attached to the attached-to member; wherein
the internal threaded portion comprises:
a first cylindrical portion adjacent to the tubular portion;
a first tapered portion adjacent to the first cylindrical portion, having an outside diameter which gradually decreases starting at the first cylindrical portion;
a second cylindrical portion adjacent to the first tapered portion, having an outside diameter smaller than the first cylindrical portion;
a second tapered portion adjacent to the second cylindrical portion, having an outside diameter which gradually decreases starting at the second cylindrical portion;
and a third cylindrical portion adjacent to the second tapered portion and having a smaller outside diameter than the second cylindrical portion.

2. The blind nut of claim 1, wherein assuming an inside diameter D for internal threaded portion roots:
the first cylindrical portion has an outside diameter of D x≥1.3 to D x≤2.6;

the second cylindrical portion an outside diameter of D x≥1.2 to D x≤2.4;
and the third cylindrical portion an outside diameter of D x≥1.1 to D x≤2.2,
where D is in mm.

3. The blind nut of claim 1, wherein
the first cylindrical portion has a length of ≥2 pitches to ≤4 pitches of the internal threaded portion,
the second cylindrical portion has a length of ≥1 pitch to ≤2 pitches of the internal threaded portion,
and the third cylindrical portion has a length of ≥0.4 pitches of the internal threaded portion.

4. The blind nut of claim 1, wherein
the first tapered portion has a length of ≥1 pitch to ≤2 pitches of the internal thread of the internal threaded portion;
and the second tapered portion a length of ≥1 pitch to ≤2 pitches of the internal thread of the internal threaded portion.

5. The blind nut of claim 1, wherein
a knurled channel is formed on the outside circumference of the tubular portion, extending circumferentially in the vertical direction at a fixed spacing.

6. The blind nut of claim 1, wherein
projections extending radially outward are formed at fixed intervals in the circumferential direction on the surface of the tubular portion under the flange.

\* \* \* \* \*